(12) United States Patent
Kurisu et al.

(10) Patent No.: US 10,599,292 B2
(45) Date of Patent: Mar. 24, 2020

(54) DISPLAY CONTROL DEVICE AND PROGRAM

(71) Applicant: NTT DOCOMO, INC., Tokyo (JP)

(72) Inventors: Toshiharu Kurisu, Tokyo (JP); Maki Sasaki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/329,100

(22) PCT Filed: Jan. 18, 2016

(86) PCT No.: PCT/JP2016/051290
§ 371 (c)(1),
(2) Date: Jan. 25, 2017

(87) PCT Pub. No.: WO2016/121553
PCT Pub. Date: Aug. 4, 2016

(65) Prior Publication Data
US 2017/0329463 A1    Nov. 16, 2017

(30) Foreign Application Priority Data

Jan. 27, 2015   (JP) .................................. 2015-013493

(51) Int. Cl.
*G06F 3/0482* (2013.01)
*G06F 3/0488* (2013.01)
*G06F 3/0481* (2013.01)

(52) U.S. Cl.
CPC .......... *G06F 3/0482* (2013.01); *G06F 3/0488* (2013.01); *G06F 3/04817* (2013.01); *G06F 3/04883* (2013.01); *G06F 2203/04803* (2013.01)

(58) Field of Classification Search
CPC ..................................................... G06F 3/0482
(Continued)

(56) References Cited

U.S. PATENT DOCUMENTS 6,590,586 B1 *   7/2003   Swenton-Wall ........ G06F 16/54
                                                     715/730
7,882,523 B2 *   2/2011   Utsuki .................. G11B 27/105
                                                     725/39
(Continued)

FOREIGN PATENT DOCUMENTS

JP    2005209174 A    8/2005
JP    2007096840 A    4/2007
(Continued)

OTHER PUBLICATIONS

Notification of Reasons for Rejection issued in corresponding Japanese Application No. JP 2016-571949 dated Jun. 2 2017, pp. 1-2.
(Continued)

*Primary Examiner* — Daniel Rodriguez
(74) *Attorney, Agent, or Firm* — MKG, LLC (57) ABSTRACT

Selection unit selects any one of a plurality of images. Display controller displays preview information of content (information representing the content detail) corresponding to an image selected from among the any one of the plurality of images by selection unit. Display controller changes the preview information of the content corresponding to the selected icon each time the icon is selected. For example, the content may include a plurality of elements, and display controller displays the plurality of elements as preview information in order of display each time the icon corresponding to the content is selected.

8 Claims, 8 Drawing Sheets

(58) Field of Classification Search
USPC .......................................................... 715/834
See application file for complete search history.

(56) References Cited

U.S. PATENT DOCUMENTS

| | | | | |
|---|---|---|---|---|
| 8,566,722 B2* | 10/2013 | Gordon | ............. | H04N 21/2665 715/721 |
| 9,798,443 B1* | 10/2017 | Gray | ................... | G06F 3/0488 |
| 2004/0233239 A1* | 11/2004 | Lahdesmaki | ......... | G06F 3/0482 715/810 |
| 2005/0120306 A1* | 6/2005 | Klassen | ............. | G06F 3/04817 715/765 |
| 2005/0229102 A1* | 10/2005 | Watson | ................. | G06F 3/0481 715/739 |
| 2007/0186177 A1* | 8/2007 | Both | ................... | G06F 3/04817 715/764 |
| 2007/0186186 A1* | 8/2007 | Both | ................... | G06F 3/04817 715/821 |
| 2008/0244455 A1* | 10/2008 | Seto | ...................... | G06F 3/1204 715/840 |
| 2009/0100361 A1* | 4/2009 | Abello | ................. | H04N 5/4403 715/764 |
| 2010/0175022 A1* | 7/2010 | Diehl | .................... | G06F 3/0481 715/784 |
| 2010/0175026 A1* | 7/2010 | Bortner | ................. | G06F 3/0481 715/818 |
| 2012/0066602 A1* | 3/2012 | Chai | ..................... | G06F 3/04817 715/733 |
| 2012/0123802 A1* | 5/2012 | Feldman | ................ | G06Q 30/02 705/3 |
| 2012/0254804 A1* | 10/2012 | Sheha | ................... | G06Q 30/02 715/834 |
| 2013/0185642 A1* | 7/2013 | Gammons | ............. | G06F 3/0482 715/733 |
| 2014/0059497 A1* | 2/2014 | Burckart | ................ | G06F 3/0482 715/854 |
| 2014/0337791 A1* | 11/2014 | Agnetta | ................ | G06F 3/0346 715/784 |
| 2015/0033123 A1* | 1/2015 | Arrasvuori | ............. | G06F 3/165 715/716 |
| 2015/0212692 A1* | 7/2015 | Hyun | .................... | G06F 3/0488 715/719 |
| 2015/0346919 A1* | 12/2015 | Robbin | ................ | G06F 3/0482 715/855 |
| 2016/0011745 A1* | 1/2016 | Baek | .................... | G06F 3/04842 715/765 |
| 2016/0088101 A1* | 3/2016 | Batiste | .................... | H04L 67/22 709/224 |

FOREIGN PATENT DOCUMENTS

| | | |
|---|---|---|
| JP | 2008250814 A | 10/2008 |
| JP | 2013117843 A | 6/2013 |
| JP | 2014030160 A | 2/2014 |

OTHER PUBLICATIONS

Extended European Search Report issued in corresponding European Application No. 16743157.6 dated Jul. 18, 2018, pp. 10.
International Search Report issued in corresponding International Application No. PCT/JP2016/051290, dated Feb. 16, 2016, pp. 1-2.
Notification of Reasons for Refusal issued in corresponding Japanese Patent Application No. 2016-571949, dated Dec. 26, 2017, pp. 1-2.

* cited by examiner

| MENU NAME | NUMBER OF TIMES OF SELECTION |
|---|---|
| DIARY | 5 |
| NEWS | 1 |
| GOURMET FOOD | 10 |
| ... | ... |

*FIG. 14*

| USER ATTRIBUTE | ORDER | | | |
|---|---|---|---|---|
| | 1 | 2 | 3 | ... |
| TWENTIES | ECONOMIC | SOCIETY | POLITICS | ... |
| SIXTIES OR MORE | SOCIETY | POLITICS | SPORTS | ... |
| TEENS OR LESS | ENTERTAINMENT | SPORTS | SOCIETY | ... |

DISPLAY CONTROL DEVICE AND PROGRAM

TECHNICAL FIELD

The present invention relates to a technique for displaying the content detail.

BACKGROUND ART

There are known in the art techniques for display of content detail. For example, JP 2005-209174A1 discloses a technique for use in an electronic device in which a corresponding function screen is provided for execution of a selected menu item and display of a detailed image representing detailed menu information when a menu icon linked to the menu item is moved to a position within a selection frame on the display.

The invention of JP 2005-209174A1 displays representative content such as a detailed image. However, when a menu icon is repeatedly moved to the position within the selection frame, the same detailed image is once again displayed. As a result, an amount of fresh knowledge that a user can acquire when repeatedly viewing the displayed information is limited.

SUMMARY

It is an object of the present invention to enable a user to acquire fresh knowledge from a displayed information when information representing content detail is displayed many times over.

According to one aspect of the present invention, there is provided a display control device including: a selection unit that selects an image from a plurality of images respectively corresponding to a plurality of categories of content; a first display controller that displays the plurality of images; and a second display controller that displays information representing content detail corresponding to the image selected by a user, and changes the information contained in the content corresponding to the selected image each time the image is selected by the selection unit.

The first display controller may display the plurality of images arranged in at least one line, and moves the plurality of images along the at least one line according to an operation performed by the user; and the second display controller may display the information contained in the content corresponding to an image displayed at a predetermined position on the at least one line, the image being included in the plurality of images.

The first display controller may move the plurality of images in a circle along the at least one line; and the second may display controller controls the information so as to prevent any change being made to the information when the image displayed at the predetermined position moves to a side of the predetermined position, and then returns to the predetermined position from the same side.

When the image moves in a first direction, the second display controller may display the information in a first order; and when the image then moves in a second direction that is opposite to the first direction, and then returns to the predetermined position, the second display controller may display the information in a second order that is opposite to the first order.

The second display controller may control the information so as to prevent any change being made to the information when the information includes a specific attribute.

When the content includes a plurality of elements, the second display controller may display the plurality of elements as the information in an order each time the image corresponding to the content is selected.

The order may be determined for a user of the display control device.

A determination unit that determines whether the content has already been viewed, may be included; and the second display controller may switch whether to change the information of the content based on a result of determination of the determination unit whether the content has already been viewed.

The second display controller may control the information so as to prevent any change being made to the information until a number of times of selection of the image corresponding to the information reaches a number of times that is determined based on an attribute of the information.

According to another aspect of the present invention, there is provided a program for causing a computer to execute a process, the process comprising: selecting an image from a plurality of images respectively corresponding to a plurality of categories of content; displaying the plurality of images; displaying information representing content detail corresponding to the image selected by a user, and changing the information contained in the content corresponding to the selected image each time the image is selected.

According to the present invention, when information representing content detail is displayed many times over, it is possible to acquire fresh knowledge from the information.

DETAILED DESCRIPTION

1 Embodiments

Figure 1:
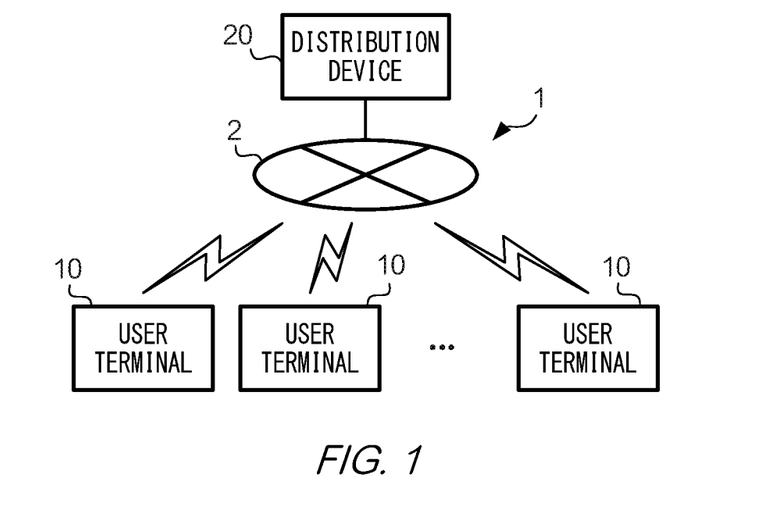
FIG. 1 is a diagram showing a configuration of a distribution system.

FIG. 1 shows a configuration of distribution system 1 according to one embodiment of the present invention. Distribution system 1 is a computer system for distributing content to be viewed by a user. The content is information that is represented by, for example, a character, an image, a sound, or the like. The content may also be referred to as digital content. For example, the content may be: weather information (e.g., a weather forecast, or a weather warning); information on a facility such as a restaurant; news information; information relating to a personal event that is of specific interest to the user (e.g., a diary update); a schedule update; information relating to an event (or a festival) such as a concert or an exhibition; and so forth.

Distribution system 1 distributes a plurality of such categories of content. The term "categories" used herein means classifications according to fields to which content relates (e.g., weather, eating out, a news article, and so on.), or providers of the content (e.g., a business or a user). The content not only is distributed from distribution device 20, but also is generated by user terminal 10. The term "content" as used in this description means either the information above, or other information that is generated by digitization of the information in a predetermined format. In one example, the content is displayed on a web page. However, the content may be any data as long as the data has a format that is readable for display by user terminal 10.

For each of the content described above, an application program (hereinafter referred to as an "app") for displaying the individual content (e.g., a program for displaying a variety of weather information) is prepared. The content is displayed by execution of the app. As described above, distribution system 1 distributes many categories of content. Thus, it is more convenient if each of the content detail can be understood without execution of the app. To make each of the content detail easier to understand, distribution system 1 displays preview information (information representing the content detail). A method of displaying the preview information will now be described below.

Distribution system 1 includes a plurality of user terminals 10 and distribution device 20, which are connected via network 2. Network 2 includes, for example, the Internet and a mobile communication network. User terminals 10 are electronic devices that can be held and carried by users. User terminals 10 are typically smartphones or tablet terminals. User terminals 10 have at least a function for outputting content.

Figure 2:
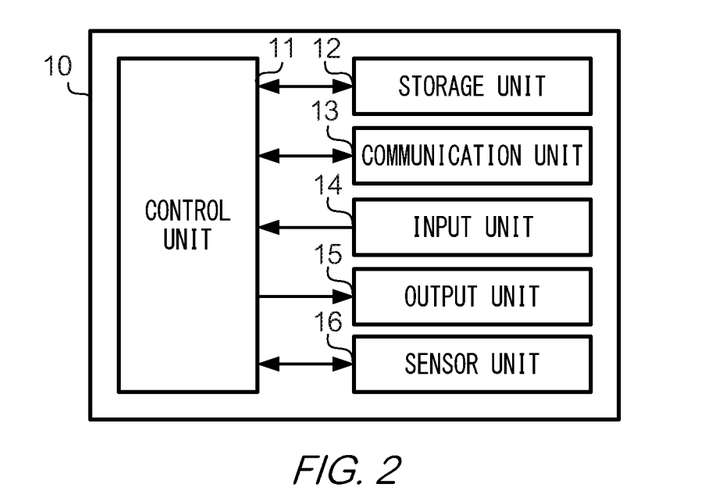
FIG. 2 is a diagram showing a hardware configuration of a user terminal.

FIG. 2 shows a hardware configuration of user terminal 10. User terminal 10 includes control unit 11, storage unit 12, communication unit 13, input unit 14, output unit 15, and sensor unit 16. Control unit 11 is a means for controlling an operation of the unit of user terminal 10. Control unit 11 includes a processing unit, such as a Central Processing Unit (CPU) and an application processor, and a memory (main memory). Control unit 11 controls an operation of the units of user terminal 10 by executing programs. The programs executed by control unit 11 include a program for controlling a display of a menu screen, which will be described later. Storage unit 12 is a means for storing data. Storage unit 12 includes a storage medium such as a flash memory. The storage medium may be attachable to user terminal 10. Storage unit 12 may store data required for an operation of control unit 11 and content received from the distribution device.

Communication unit 13 is a means for transmitting and receiving data via network 2. Communication unit 13 includes a baseband processor and an antenna. Communication unit 13 performs a modulation and demodulation according to network 2 when transmitting and receiving the data. Communication unit 13 receives content from distribution device 20 via network 2. Input unit 14 is a means for receiving an input of data. Input unit 14 includes a keypad and microphone. When a display unit includes a touch screen display, input unit 14 may include a sensor portion of the touch screen display. Output unit 15 is a means for outputting data.

Output unit 15 includes at least a display unit including, for example, a liquid-crystal display. In this embodiment, the display unit includes a touch screen display. Output unit 15 may include a speaker. That is, the meaning of the term "output" as used herein is not limited to a display. Sensor unit 16 is a means for detecting a change in status of user terminal 10 and a user. Sensor unit 16 includes a plurality of sensors. For example, sensor unit 16 includes a Global Positioning System (GPS) module that detects a position of user terminal 10.

Distribution device 20 is a server device for distributing content. Distribution device 20 stores a plurality of categories of content, and transmits to user terminals 10 the content selected for users. The content stored in distribution device 20 may be created and provided by, for example, a third party business (a content provider).

Figure 3:
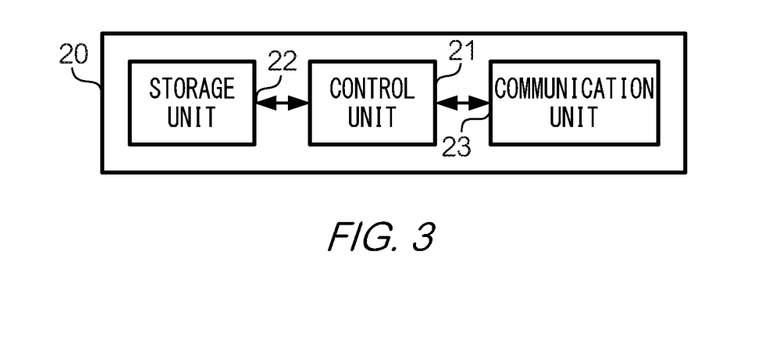
FIG. 3 is a diagram showing a hardware configuration of a distribution device.

FIG. 3 shows a hardware configuration of distribution device 20. Distribution device 20 includes control unit 21, storage unit 22, and communication unit 23. It is to be noted that the function of distribution device 20 may be achieved by cooperation of a plurality of server devices, rather than reliance on a single device.

Control unit 21 is a means for controlling an operation of the units of distribution device 20. Control unit 21 includes a processing unit, such as a CPU, and a memory. Control unit 21 distributes content selected for each user at a predetermined timing by executing a program for controlling a distribution of content to each user.

Storage unit 22 is a means for storing data. Storage unit 22 includes a storage medium, such as a hard disk drive. Storage unit 22 stores data required for operation of control unit 21 and for content to be distributed to user terminals 10. Communication unit 23 is a means for transmitting and receiving data via network 2. Communication unit 23 transmits the content to user terminals 10. Communication unit 23 may also receive new content from an external server device or other devices, as required.

The configuration of distribution system 1 is as described above. Each user terminal 10 displays content according to an operation performed by the user. User terminal 10 displays a menu screen for displaying content.

Figure 4:
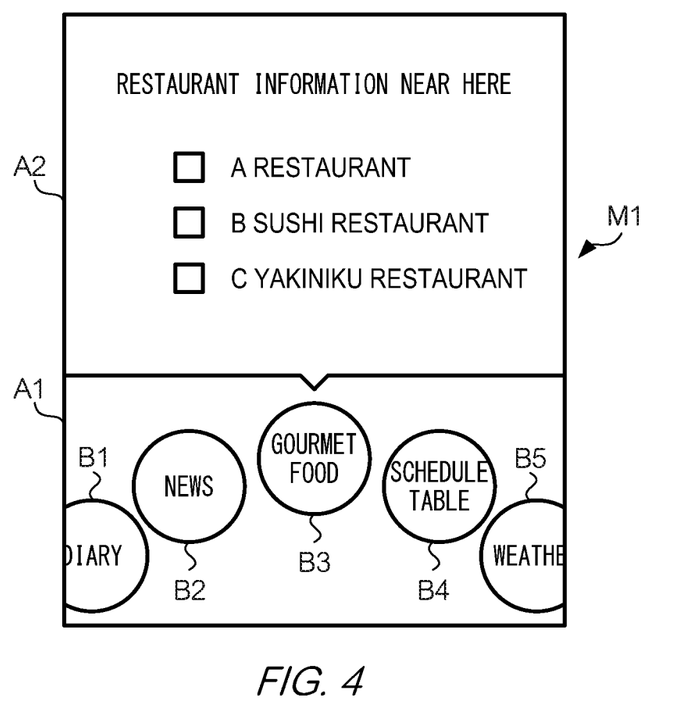
FIG. 4 is a diagram showing an example of a menu screen.

FIG. 4 shows an example of a menu screen. Menu screen M1 includes areas A1 and A2. Area A1 is a display area of a plurality of images (hereinafter referred to as "icons") linked to a plurality of categories of content. In area A1, five icons B1 to B5 are disposed. However, the number of icons displayed in area A1 is not limited to five. The number of icons may be less than or equal to four, or alternatively may be more than or equal to six. Only some of the total number of icons to be displayed are displayed in area A1.

The icons to be displayed are, for example, set by a user. In each icon, a content menu name, which is information summarizing content, linked to the icon, or a character or an image representative of an identifier of the content (e.g. a diary, news, gourmet food, a schedule table, weather, and so forth) is displayed. For example, in icon B3, there are displayed characters "gourmet food," which are representative of a menu name linked to content for displaying gourmet food information; for example, information on a gourmet restaurant or other information relating to gourmet food, the information displayed being dependent on a location of user terminal 10. In icon B4, there are displayed characters "schedule table," which are representative of a menu name linked to content relating to a schedule of the user. When a predetermined operation is performed to display content corresponding to the icon, for example, a tap operation performed on the icon, the content is displayed by execution of the corresponding app.

Area A2 is an area designated for displaying preview information linked to an icon selected from the plurality of icons to be displayed in area A1. The preview information is visual information representative of content detail as described above. The preview information serves to enable a user to understand content detail, or at least a part of content detail, without a need for the content to be displayed in its entirety. For example, the preview information may be a character or an image that is included in the content or that is obtained by editing or processing the character or image (e.g., a thumbnail), or another character or image that explains the character or image. The character or image represented by the preview information may constitute either a part of the content or the entire content. Thus, the preview information may constitute a content summary, or content detail. The preview information can be determined for each of content in advance and may be included in content data. Alternatively, the preview information may be generated from the content data upon execution of an application program.

In the example shown in FIG. 4, "restaurant information near here," which is a part of gourmet food information, is displayed as preview information of content linked to the icon "gourmet food." The content of the gourmet food information includes, in addition to this information, restaurant information in each area, a menu of each restaurant, photos of the inside of restaurants, a list of charges, and a map showing the location of each restaurant. These items of gourmet food information are displayed by execution of the corresponding app. At this time, menu screen M1 is switched to another screen on which the content is displayed. That is, the preview information is displayed on a screen used for an operation of an icon to display corresponding content; while the content is displayed on another screen that is switched from this screen. In this manner, the preview information and content in this embodiment differ in that the preview information is displayed together with an icon (area A1), while the content is not displayed with any icon.

User terminal 10 controls a display of an icon in area A1 according to an operation performed by a user. More specifically, when the user performs a drag operation or flick operation (an operation in which a finger is swiped on a screen) in either direction to the right or left on area A1, user terminal 10 controls the display of the icon such that the icon moves in the direction input by the operation.

Figure 5:
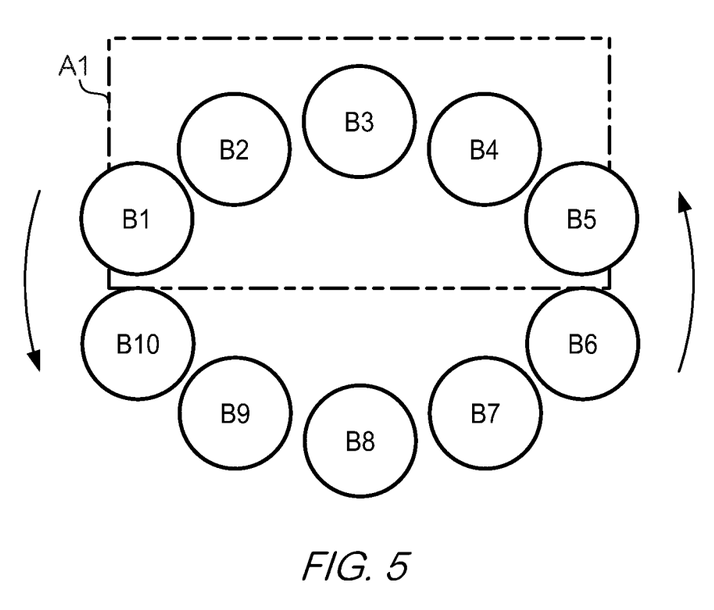
FIG. 5 is a diagram showing one concept for displaying icons.
Figure 6:
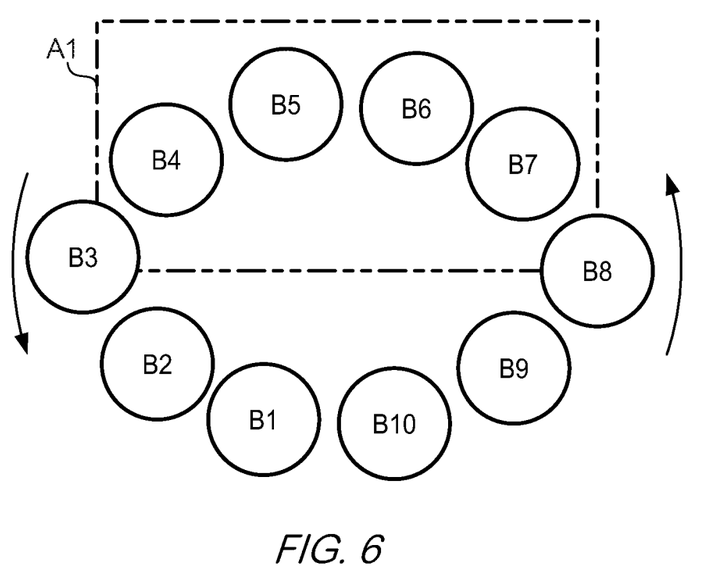
FIG. 6 is a diagram showing another concept for displaying icons.
Figure 7:
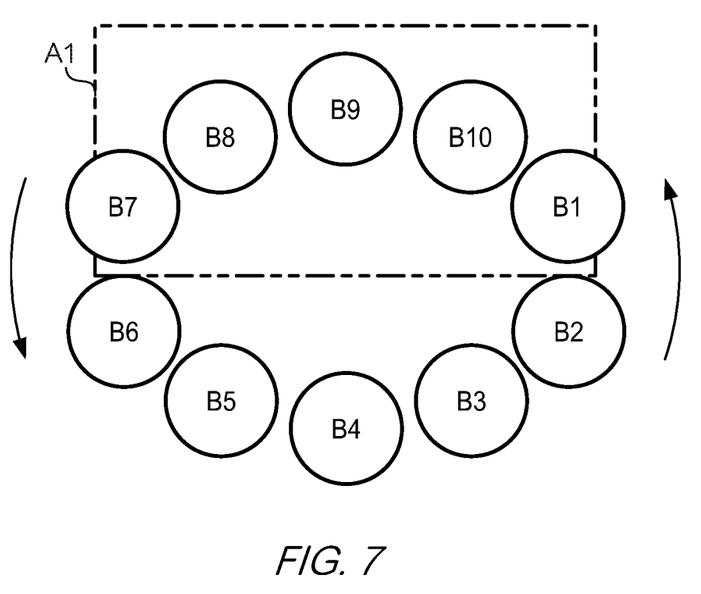
FIG. 7 is a diagram showing yet another concept for displaying icons.

Each of FIGS. 5 to 7 is a diagram showing one concept for display of icons. The concept for display refers to a visual appearance. In this example, the number of icons to be displayed is "10," and the number of icons displayed in area A1 of menu screen M1 at once is "5." User terminal 10 displays icons B1 to B10 such that icons B1 to B10 arranged in a predetermined order move in a circle. The term "move in a circle" as used herein refers to a movement of icons such that they are repeatedly displayed in the same order, namely, a movement of a displayed portion in which an order in which icons are arranged is maintained. For example, when the icons are moved in a counter-clockwise direction from positions shown in FIG. 5, icon B1 is temporarily hidden from menu screen M1 as shown in FIG. 6. When the icons continue to be moved in the same direction, icon B1 is displayed on menu screen M1 again, as shown in FIG. 7.

When movement of the icons is stopped, user terminal 10 displays each icon at a predetermined position. More specifically, user terminal 10 may display any one of the icons at the center of area A1, and displays the other icons in area A1 at positions such that five icons are arranged with a predetermined space between them. As a result, when movement of the icons is stopped, five icons are always displayed on menu screen M1, and any one of the five icons may be displayed at the center of area A1. In contrast, during movement of the icons, it may be the case that no icon is displayed at the center of area A1, as shown in FIG. 6.

In area A2, preview information of content corresponding to the icon displayed at the center of area A1 is displayed. That is, an icon displayed at the center of area A1 according to an operation performed by a user is selected from among the plurality of icons as an icon linked to preview information to be displayed. It is to be noted that in this embodiment, user terminal 10 does not display any preview information when an icon moves through the center of area A1 during movement of the icons. User terminal 10 displays preview information when an icon is displayed at the center of area A1 in a static state. When the icon is moved from the center of area A1, user terminal 10 no longer displays this preview information. It is to be noted that a display of preview information is not limited to this example. User terminal 10 may display preview information when an icon passes through the center of area A1 without stopping. User terminal 10 may continue to display preview information after the corresponding icon is moved from the center of area A1 until another icon is stopped at the center.

Upon receiving the above predetermined operation (e.g., a tap operation) on an icon displayed at the center, user terminal 10 executes a predetermined process. The predetermined process includes, for example, a process for displaying content linked to an icon on which the predetermined operation is performed, and a process for launching an app associated with the icon (namely, an app corresponding to the content). It is to be noted that user terminal 10 may execute different processes for different icons (namely, different items) at this time. In this embodiment, user terminal 10 does not execute the above predetermined process when the predetermined operation is performed on an icon other than the icon displayed at the center. However, the manner of execution of the predetermined process is not limited to this example. The predetermined process may be executed when the predetermined operation is performed.

Figure 8:
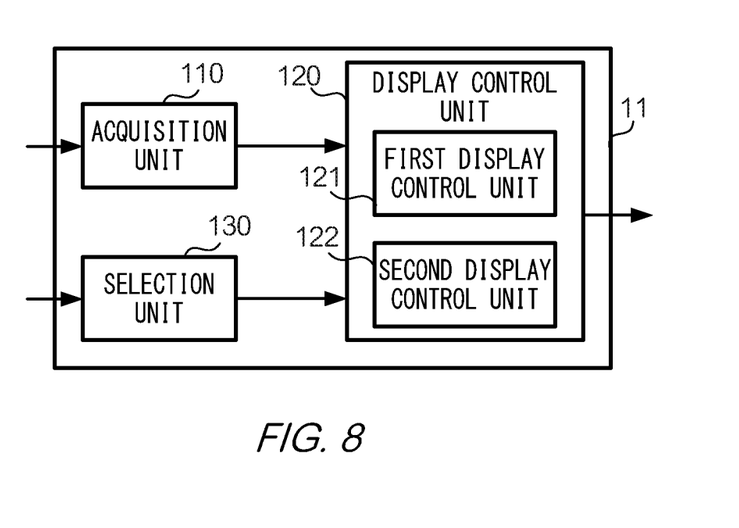
FIG. 8 is a diagram showing a functional configuration of the user terminal regarding display control of icons.

FIG. 8 shows a functional configuration of user terminal 10 regarding a display control of an icon. Control unit 11 of user terminal 10 realizes functions corresponding to acquisition unit 110, display controller 120, and selection unit 130, which are described below, by executing a predetermined program.

Acquisition unit 110 is a means for acquiring content. Acquisition unit 110 acquires content from distribution device 20 via network 2. Acquisition unit 110 may also acquire content to be displayed that is generated in user terminal 10 or is stored in user terminal 10. Acquisition unit 110 provides display controller 120 with the acquired content.

Display controller 120 is a means for controlling a display of a menu screen as described with reference to FIGS. 4 to 7. Display controller 120 includes first display controller 121 and second display controller 122. First display controller 121 controls a display of icons. Second display controller 122 controls a display of preview information. First display controller 121 determines an arrangement of the icons, moves or stops the icons according to an operation performed by a user, and changes a moving speed of the icons according to a moving speed of a finger of the user. First display controller 121 associates image data of each icon with identification information used for identifying each icon and information indicating a position of each icon using coordinates, to control a display of the icons.

More specifically, first display controller 121 displays a plurality of icons arranged in at least one line (in this embodiment, one line) on the screen, which is included in output unit 15, as shown in, for example, FIG. 5. First display controller 121 moves the plurality of icons along the at least one line according to an operation performed by a user, such as the above drag operation or flick operation. First display controller 121 also moves the plurality of icons in a circle as described above.

Selection unit 130 is a means for selecting any one of the plurality of icons. In this embodiment, selection unit 130 selects an icon displayed at the center of area A1. For example, selection unit 130 selects an icon identified by identification information corresponding to information indicating the center position of area A1 with reference to information representing a position of each icon associated by first display controller 121. Selection unit 130 notifies display controller 120 of identification information of the selected icon.

Second display controller 122 displays preview information corresponding to an icon identified by the notified identification information. That is, second display controller 122 displays preview information of content corresponding to the icon selected by selection unit 130 from the plurality of icons. Second display controller 122 also changes preview information of the content corresponding to the selected icon each time the icon is selected; that is, it changes preview information to be displayed in response to the selection. When the content includes a plurality of elements, second display controller 122 displays the plurality of elements in order (in this embodiment, a predetermined order) as preview information each time an icon corresponding to the content is selected. The details of a transition of preview information will be described below.

Figure 9:
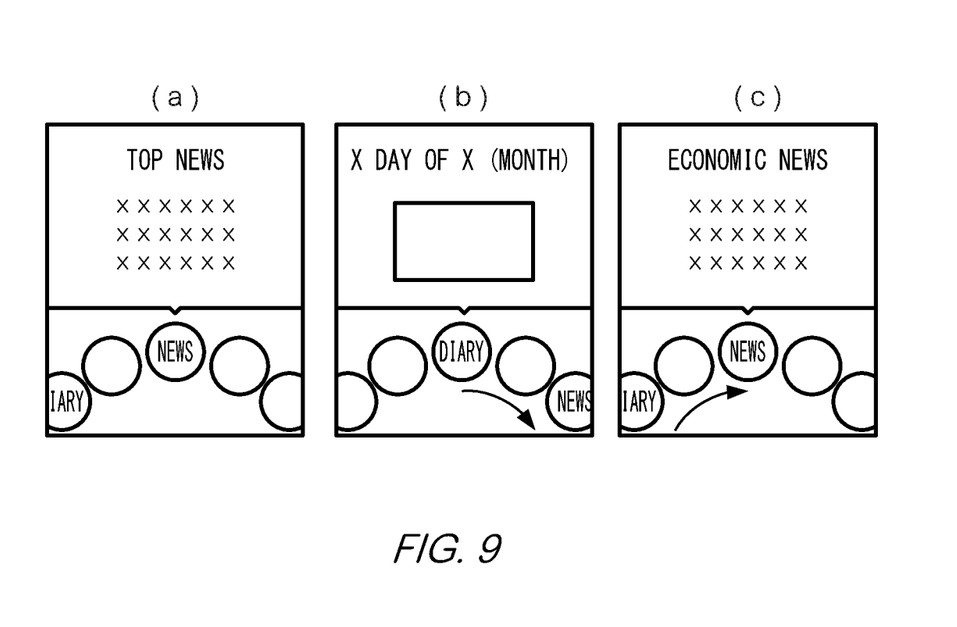
FIG. 9 is a diagram showing an example of a transition of preview information.

FIG. 9 shows an example of a transition of preview information. In FIG. 9 (a), an icon of content of news is located at the center of area A1, and an article on "top news" is displayed as preview information. In FIG. 9 (b), an icon of a diary is located at the center of area A1 according to an operation performed by a user to move the icons in a clockwise direction from positions shown in FIG. 9(a), and then preview information linked to the icon is displayed. In FIG. 9 (c), the icon of content of news is located at the center of area A1 again according to an additional operation performed by the user to move the icons further in the clockwise direction.

In this case, second display controller 122 changes preview information to be displayed from the article on "top news" displayed in FIG. 9 (a) to a different article, on "economic news." The content of news includes a plurality of elements such as political news, international news, entertainment news, and sports news, as well as the top news and economic news. Second display controller 122 displays these elements in order as preview information each time the icon of content of news is moved to the center of area A1 and is selected by selection unit 130.

The plurality of elements included in the content may include the following other information. The content of the diary may include a plurality of elements that pertain to user entries in the diary for separate days. The content of the gourmet food may include a plurality of elements that pertain to restaurant information in areas, or restaurant information for types of food or for average price ranges. The content of the schedule table may include a plurality of elements that pertain to weekly schedules. The content of the weather may include a plurality of elements that pertain to weather in certain areas, at certain times, or on certain days. A plurality of elements may be the summary of content (information explaining an outline of content) and the content detail of (information explaining the content detail). Information used as the plurality of elements is predetermined for each category of content.

The plurality of elements may include duplicate information. For example, an article may be duplicated by appearing both in "top news" and in "economic news." That is, second display controller 122 displays, as preview information, information including at least a portion different from information that was displayed as preview information the previous time.

A procedure of an operation of user terminal 10 when preview information is changed will be described below.

Figure 10:
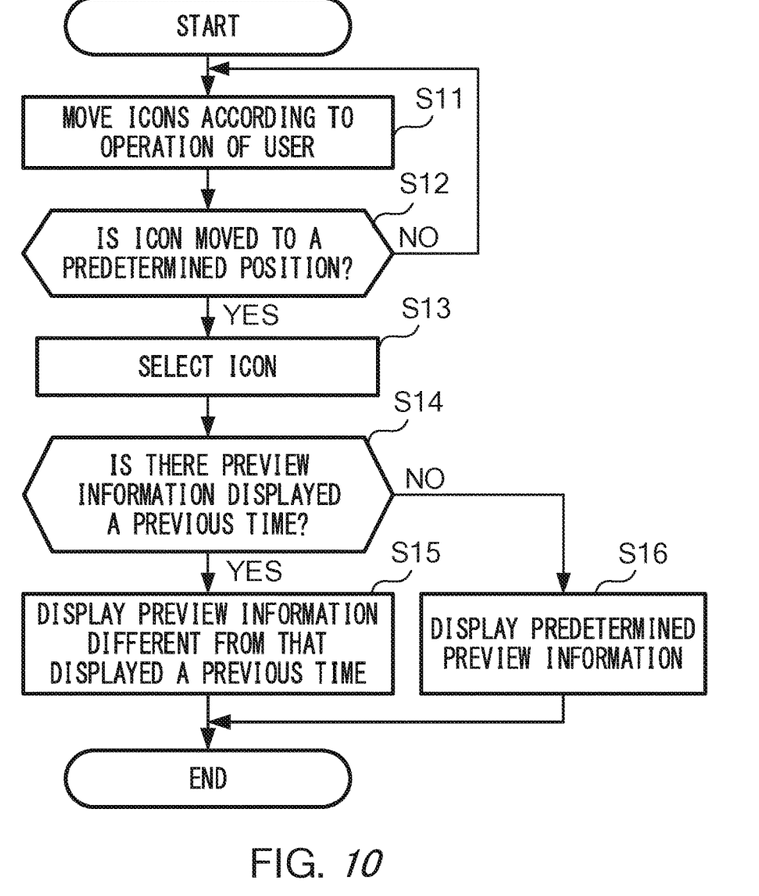
FIG. 10 is a diagram showing an example of a procedure of an operation of the user terminal.

FIG. 10 is an example of a procedure of an operation of user terminal 10. Control unit 11 of user terminal 10 firstly moves icons according to an operation performed by a user (step S11). Control unit 11 determines whether an icon is moved to a predetermined position (in this embodiment, the center of area A1) according to the operation (step S12). When it is determined that no icon is moved to the predetermined position (S12: NO), control unit 11 returns to step S11 to perform the above operation. Meanwhile when it is determined that an icon is moved to the predetermined position (S12: YES), control unit 11 selects this icon as an icon corresponding to content whose preview information is displayed (step S13). The operation of step S11 is performed by first display controller 121. These operations of steps S12 and S13 are performed by selection unit 130.

Control unit 11 then determines whether there is preview information that was displayed the previous time for the content of the selected icon (step S14). When it is determined that there is preview information that was displayed the previous time (S14; YES), control unit 11 displays preview information different from that displayed the previous time (step S15). When it is determined that there is no preview information that was displayed the previous time (S14; NO), control unit 11 displays predetermined preview information (step S16). The predetermined preview information is, for example, information determined to be firstly displayed as preview information for the content. These operations of steps S14, S15, and S16 are performed by second display controller 122.

In this embodiment, an icon that is displayed at the center of area A1 in a static state is selected, and preview information of content corresponding to the selected icon is displayed. Preview information to be displayed is changed each time the icon is selected. According to this embodiment, when preview information, namely, information representing the content detail, is displayed, the preview information is changed. If the preview information is not changed, it is preview information already familiar to the user, which prevents the user from acquiring fresh knowledge from the displayed preview information. In this embodiment, the preview information is changed each time an icon is selected. This allows acquisition of fresh knowledge from the preview information.

Additionally, in this embodiment, a plurality of elements included in content is displayed in order as preview information. This allows a user to be thoroughly informed of the content detail, compared with a case where preview information is displayed regardless of the plurality of elements. Further, in this embodiment, an icon is moved according to an operation performed by a user, and preview information corresponding to an icon displayed at a predetermined position is displayed. This allows a user to understand a correspondence between an icon and content whose preview information is displayed, compared with a case where a position of an icon linked to preview information to be displayed is not determined.

2 Modifications

The above embodiment is merely an example of an embodiment of the present invention. The above embodiment may be modified as described below. The above embodiment and the following modifications may be carried out in combination with each other.

2-1 Maintenance of Preview Information

In the above embodiment, second display controller 122 always changes preview information each time an icon is selected. The manner of changing preview information is not limited this example. In this modification, it is assumed that icons are moved in a circle and preview information linked to an icon displayed at a predetermined position is displayed as described in the above embodiment. For example, second display controller 122 does not change the preview information when the icon displayed at the predetermined position is moved to one side of the predetermined position and then is returned to the predetermined position from the same side; while second display controller 122 changes the preview information when the icon returns to the predetermined position from the other side. The change of preview information as used herein is a change of preview information that is to be displayed by second display controller 122 each time an icon is selected by selection unit 130.

Figure 11:
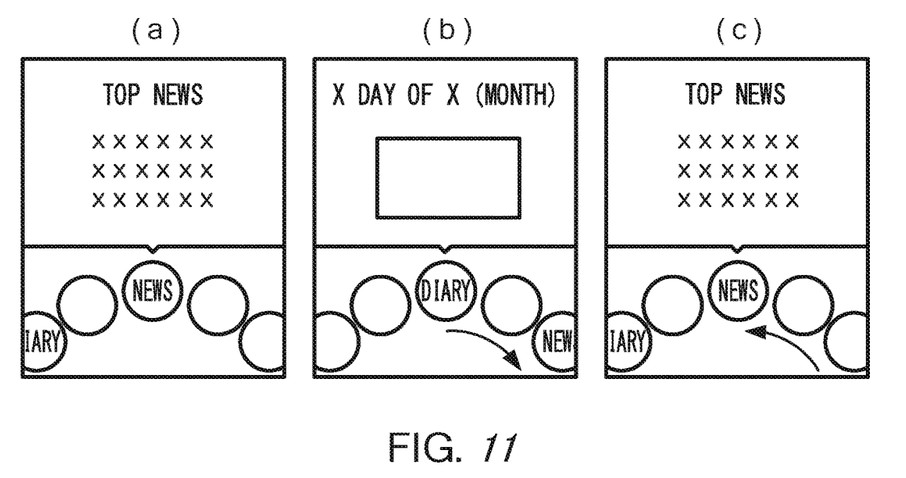
FIG. 11 is a diagram showing an example of a transition of preview information according to one modification.

FIG. 11 shows an example of a transition of preview information according to this modification. In this example, an article on "top news" of content of news is displayed as preview information as shown in FIG. 11(a). When a user performs an operation to move icons in a clockwise direction, namely, an operation to move icons to the right side of a predetermined position, preview information of a diary is displayed as shown in FIG. 11(b). When the user performs an operation to move the icons in a counter-clockwise direction, the icon of news returns to a predetermined position from the right side of the predetermined position, namely, the icon returns to the predetermined position from the same side as that to which the icon was moved. Then the article on "top news" is displayed again as preview information as shown in FIG. 11(c).

According to this modification, preview information that has been displayed once and is no longer displayed, is displayed again as a result of an operation to move icons in the direction opposite to the former direction. This allows a user to view again preview information that has been viewed once and is no longer displayed when the user wishes to view the preview information again. Additionally, such a display of preview information is performed as a result of an operation to change a direction of movement of an icon to the opposite direction. Thus, a redisplay of preview information is enabled by an intuitive operation.

2-2 Display of Preview Information that has been Displayed Before

When an icon is moved in the opposite direction as described above, preview information to be displayed may revert to preview information that was displayed previously. In this case, second display controller 122 displays a plurality of items of preview information in a first order while icons are moved in a first direction. When the icons are then moved in a second direction, opposite to the first direction, and a target icon corresponding to the preview information is returned to a predetermined position, second display controller 122 displays the plurality of items of preview information that were displayed previously in a second order, opposite to the first order.

Figure 12:
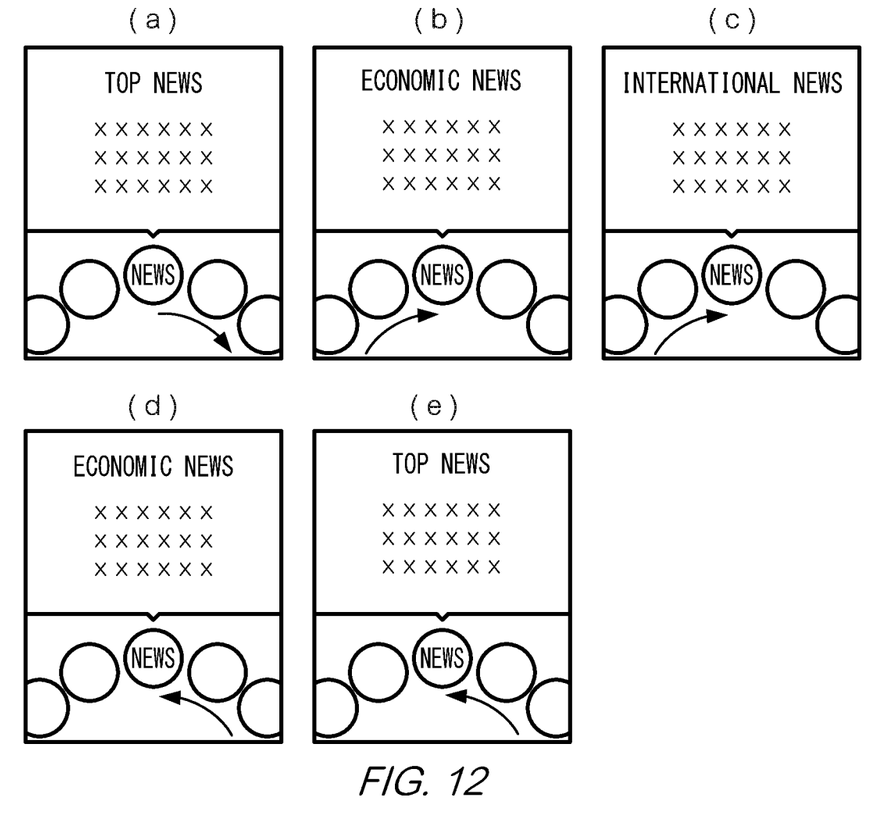
FIG. 12 is a diagram showing an example of a transition of preview information according to another modification.

FIG. 12 shows an example of a transition of preview information according to this modification. In this modification, an article on "top news" of content of news is displayed as preview information as shown in FIG. 12(a). When a user performs an operation to move icons around once in a clockwise direction (a first direction in this modification), an article on "economic news" is displayed as preview information as shown in FIG. 12(b). When the user performs an additional operation to move the icons further around once, an article on "international news" is displayed as preview information as shown in FIG. 12(c). In this modification, second display controller 122 displays preview information in a first order of "top news," "economic news," and "international news."

When the user then performs an operation to move the icons around once in a counter-clockwise direction (a second direction in this modification), the article on "economic news" is displayed as preview information again as shown in FIG. 12(d). When the user performs an additional operation to move the icons further around once, the article on "top news" is displayed as preview information again as shown in FIG. 12(e). In this modification, second display controller 122 displays preview information in a second order of "international news," "economic news," and "top news." In this manner, second display controller 122 displays older preview information when icons are rotated in the second direction.

According to this modification, a user can view preview information of content that has been displayed before. This preview information includes not only preview information displayed the previous time, but also preview information displayed two or more times previously. It is to be noted that second display controller 122 does not have to display previously displayed preview information in the above order. For example, second display controller 122 may display this preview information randomly. Second display controller 122 may display previously displayed preview information in descending order of term in which preview information is displayed. This enables early display of preview information in which a user may have a particular interest.

2-3 Attribute of Preview Information

Figure 13:
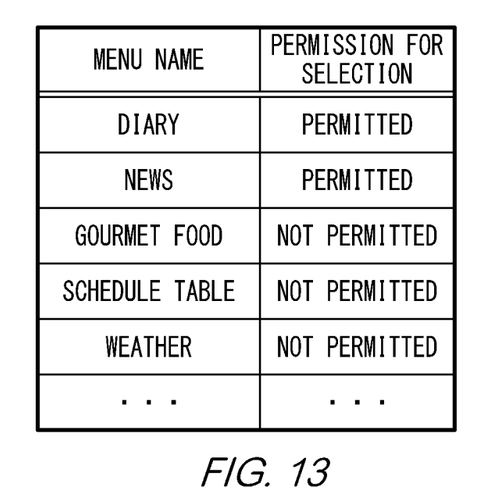
FIG. 13 is a diagram showing an example of a change permission table.

A case in which preview information is not changed is not limited to the above example. For example, second display controller 122 does not change preview information as described above when the preview information has a specific attribute. Preview information as used herein is that displayed currently or the previous time. The specific attribute is, for example, such an attribute that preview information belongs to specific content. In this case, second display controller 122 uses a change permission table associating, for example, a menu name of each content with information representing whether to permit preview information to change.

FIG. 13 shows an example of a change permission table. In this example, preview information of content having menu names "diary" and "news" is changeable; while preview information of content having menu names "gourmet food," "schedule table," and "weather" is not permitted to be changed. Second display controller 122 refers to the information representing whether to permit a change of preview information linked to a menu name of an icon displayed at a predetermined position. When a change is "permitted," second display controller 122 displays preview information changed from that displayed the previous time. When a change is "not permitted," second display controller 122 displays preview information that is the same as that displayed the previous time. This prevents preview information of the specific content from being changed each time an icon is selected.

It is to be noted that when the content detail vary, preview information may vary accordingly. For example, when a weather forecast is displayed as preview information, the weather forecast varies because the weather changes between morning and afternoon. In this case, when a change of preview information is not permitted, new preview information is actually displayed. That is, "not permitted" as used in this modification means that even when a change of preview information is not permitted to be performed each time an icon is selected (e.g., typhoon information is displayed next to a weather forecast), though the preview information does not vary, the corresponding content may vary (e.g., a weather forecast displayed in the morning continues to be displayed in the afternoon).

An attribute of preview information that is not changed is, for example, such an attribute that information is generated according to a preference of a user (such as recommended shopping information and restaurant information). Information having this attribute is of particular interest to a user. Additionally, a provider of this information may wish a user to view this information many times. Thus, it is preferred that this information is not provided repeatedly. The attribute of such preview information may also be such an attribute that information corresponds to a location of a user (such as restaurant information near a user), and such an attribute that information corresponds to a current time (such as a next schedule of a user and limited-time sale information). These categories of information may become irrelevant when a user moves or too much time has passed. Thus, it is preferred that these categories of information are displayed repeatedly without changing to other information when a user rotates icons, to allow the user to find the information easily. According to this embodiment, it is possible to display preview information that is preferred not to be changed each time an icon is selected without changing the preview information.

It is to be noted that an attribute of preview information may vary. For example, when a position of a user changes, information corresponding to the position of the user varies. When the time has passed, information corresponding to the current time varies. When preview information has such an attribute that information corresponds to a location of a user or information corresponds to the current time, and the attribute is changed to another attribute, second display controller 122 displays changed preview information after the attribute is changed. In contrast, an attribute of preview information may be changed to such an attribute that information corresponds to a location of a user or information corresponds to the current time. In this case, second display controller 122 does not change preview information after the attribute is changed, even if changed preview information has been displayed before.

In this case, for example, when a user is located in Shibuya (a Japanese city), recommended restaurant information in Shibuya is displayed many times repeatedly; while recommended restaurant information in an area other than Shibuya is switched and displayed. More specifically, when recommended restaurant information is displayed in a predetermined order (e.g., an order of Shinjuku (another Japanese city), Shinagawa (another Japanese city), and Shibuya) as described in the above embodiment, recommended restaurant information is displayed in the order of Shinjuku, Shinagawa, and Shibuya. After that, recommended restaurant information in Shibuya is displayed as preview information many times repeatedly while the user is located in Shibuya. Similarly, in an example of information of a schedule table, information of each schedule is switched and displayed when a schedule time of the schedule is far from the present. When the end of the schedule time is approaching, information of the schedule is displayed as preview information many times repeatedly.

2-4 Number of Times of Selection of Icon

Figure 14:
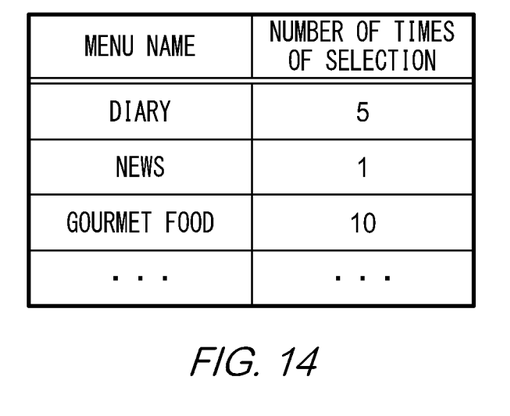
FIG. 14 is a diagram showing an example of a selection count table.

Preview information may be changed when the number of times of selection of the corresponding icon is greater than or equal to a threshold, instead of being changed each time the icon is selected. The threshold may vary. The threshold may be determined based on an attribute of preview information. For example, second display controller 122 does not change preview information until a number of times of selection of an icon linked to the preview information by selection unit 130 reaches a number of times determined according to an attribute of the preview information. The attribute of preview information is, for example, an attribute that is a category of content to which the preview information belongs. In this case, second display controller 122 uses a selection count table associating a menu name of each category of content with the number of times of selection (a threshold) of the corresponding icon.

FIG. 14 shows an example of a selection count table. In this example, menu names "diary," "news," and "gourmet food" are associated with numbers of times of selection "5," "1," and "10," respectively. Second display controller 122 refers to the number of times corresponding to a menu name of an icon displayed at a predetermined position. When the number of times of selection of the icon after preview information was changed previously is smaller than the threshold, second display controller 122 does not change the preview information. When the number of times of selection is greater than or equal to the threshold, second display controller 122 displays changed preview information. This allows different frequencies at which preview information is changed to be set for different preview information.

It is to be noted that in another embodiment, the number of times of selection may vary according to a field that is any one of top news, economic news, and political news, although preview information is of the same content of news. In this case, an attribute of preview information is a field to which an article of content of news belongs. In an example of content of a diary, the number of times of selection may vary according to whether preview information includes a photo. In any of these cases, frequency at which preview information is displayed may be set such that frequency at which information that a provider wishes to convey to a user of (e.g., recommended restaurant information) is changed decreases; while frequency at which information that a provider wishes convey as being of particular interest of a user to (e.g., an article on news) is changed increases.

2-5 Order in which a Plurality of Elements are Displayed

Figure 15:
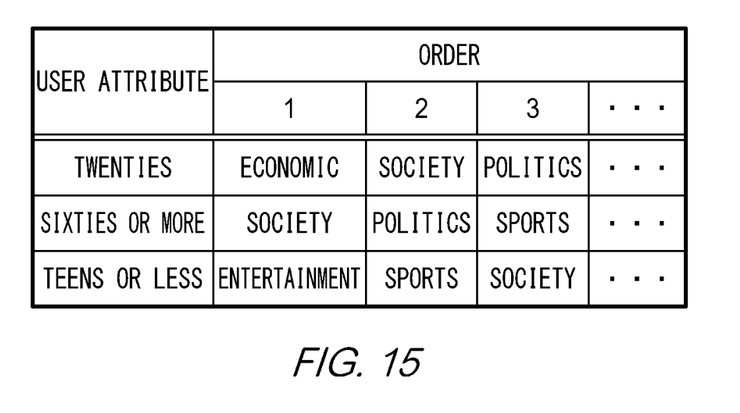
FIG. 15 is a diagram showing an example of an order table.

In the above embodiment, second display controller 122 displays a plurality of elements included in content in a predetermined order. However the order in which the plurality of elements are displayed is not limited to this example. For example, the order may be set for each user of user terminal 10. In this case, for example, second display controller 122 displays the plurality of elements as preview information in an order according to an attribute of the user. The attribute of the user includes age, gender, occupation, and preference. These attributes may be stored in storage unit 12 of user terminal 10 in advance, or may be acquired from an external device. To display preview information in the above order, second display controller 122 uses an order table associating, for example, an attribute of a user with an order of each element.

FIG. 15 shows an example of an order table. In this example, user attributes "twenties to fifties," "sixties or more," and "teens or less" (age of a user) are associated with orders of elements of content of news. For example, user attribute "twenties to fifties" is associated with the first order for element "economy," the second order for element "society," and the third order for element "politics.". Second display controller 122 refers to a user attribute stored in the terminal, and displays each element as preview information in an order associated with the user attribute in the order table. It is to be noted that in another example, a user attribute may be acquired from an external device that allows access by use of an ID and a password, which are input by a user.

The order table may associate an attribute other than the age of users with an order. In another example, instead of using the order table, a possibility that a user is interested in each element of content may be estimated from a history of web pages that a user having each attribute has viewed, and an order may be determined according to the estimate. For example, it is assumed that preview information of content for providing sports news is displayed. In this case, when a user prefers to view an image, preview information including a photo is displayed early. When the user prefers to view the details of a play, preview information including an article on the details of a play is displayed early. When the user prefers to view a result of a game, preview information including an article on a result of a game is displayed early. In any of these cases, a plurality of elements are displayed in a decreasing order of interest that a user may have, thus increasing a possibility that a user views displayed preview information compared with a case where an order is set without using the user attribute.

2-6 Moving Speed of Icons

Second display controller 122 may switch whether preview information changes according to a moving speed of an icon that is moved to a predetermined position. In this case, for example, second display controller 122 calculates, as a moving speed, an average speed at which an icon is moved to a predetermined position from the start point to the end point. When the calculated moving speed is greater than or equal to a threshold, second display controller 122 changes preview information; while when the calculated moving speed is smaller than the threshold, second display controller 122 does not change the preview information. This is because when a user moves an icon to a predetermined position at high speed, that means the icon is the target of the user, and the user is likely to view preview information linked to the icon. Thus, changed information is displayed when the icon is moved to the predetermined position subsequently.

Meanwhile when a user moves an icon to a predetermined position slowly, that means a user is moving icons while searching a target icon. In this case, a user is unlikely to view preview information. Thus, the same preview information is displayed when an icon is moved moves to the predetermined position next time. It is to be noted that in contrast to the above example, second display controller 122 may change preview information when the moving speed is smaller than a threshold, and may not change preview information when the moving speed is greater than or equal to the threshold.

2-7 Variety of Operation of User

Second display controller 122 may switch whether to change preview information according to a variety of operations performed by a user when an icon is moved to a predetermined position. The variety of the operations performed by the user includes, for example, the drag operation and flick operation. When a user performs the drag operation, a finger of the user is separated from a display surface at a predetermined position or near the predetermined position. This allows an intended icon to be moved to a predetermined position, and the corresponding preview information to be displayed accordingly. Meanwhile, when the user performs the flick operation, an icon continues to move for a while after a finger of the user is separated from a display surface, and then stops. This may cause an icon to be selected by a user unintentionally.

Therefore, when an icon is moved to a predetermined position by an operation that is terminated when or after the icon stops (e.g., the drag operation), second display controller 122 changes preview information; while when the icon is moved to the predetermined position by an operation that is terminated while the icon is moving (without stopping) (e.g., the flick operation), second display controller 122 does not change preview information. This allows preview information that is intended to be displayed by a user to be changed, while other preview information is not changed.

It is to be noted that the variety of operations performed by the user may include an operation using a finger of a user, an operation using an instrument such as a touch pen, and an operation to rotate or incline user terminal 10. In this case, sensor unit 16 of user terminal 10 includes an acceleration sensor and a gyro sensor to detect a rotation or an inclination of the body of user terminal 10. For example, second display controller 122 calculates a contact area between a screen and a finger or instrument by a detection result of a sensor portion of a touch screen display of input unit 14. When the calculated contact area is greater than or equal to a threshold, second display controller 122 determines that the operation is performed using a finger; while when the calculated contact area is smaller than the threshold, second display controller 122 determines that the operation is performed using an instrument.

For example, since an operation using a finger allows an icon intended by a user to be selected, the corresponding preview information is likely to be viewed. Thus, second display controller 122 changes preview information when the operation using a finger is performed. Compared to the operation using a finger, by the operation using an instrument it is more difficult to move an icon to a target position. It is much more difficult to make such a movement by the operation to rotate or incline the body. This may lead to erroneous selection of another icon(s) before an intended icon is selected. In this case, preview information corresponding to the other icon is unlikely to be viewed.

When an operation using an instrument or an operation to rotate or incline the body of user terminal 10 is performed, preview information linked to an icon that is selected before a target icon is selected, which is stopped for a period of time exceeding a threshold, is unlikely to be viewed. Thus, second display controller 122 does not change preview information when the same icon is selected subsequently. Meanwhile, preview information linked to an icon that is stopped for a time exceeding the threshold and is selected, is likely to be viewed. Thus, second display controller 122 changes preview information when the same icon is selected subsequently. This prevents preview information that has been viewed by a user from being displayed many times repeatedly, and reduces display of preview information that is not likely to be viewed by a user.

2-8 Determination Whether Content has been Viewed

Figure 16:
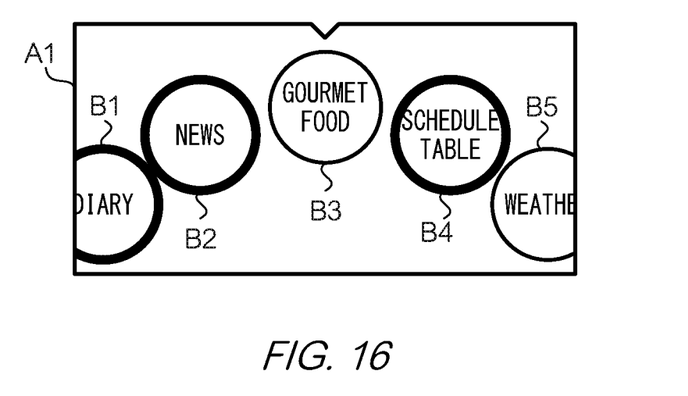
FIG. 16 is a diagram showing how previously viewed icons are displayed.

Distribution system 1 distributes many kinds of content. A manner in which an icon is displayed may show whether content has been viewed.

FIG. 16 shows an example of how previously viewed icons are displayed. In this example, icons B3 and B5 are shown as viewed icons (a line of the outer circumference is thin). Icons B1, B2, and B4 are shown as icons that have not been viewed (a line of the outer circumference is thick).

Figure 17:
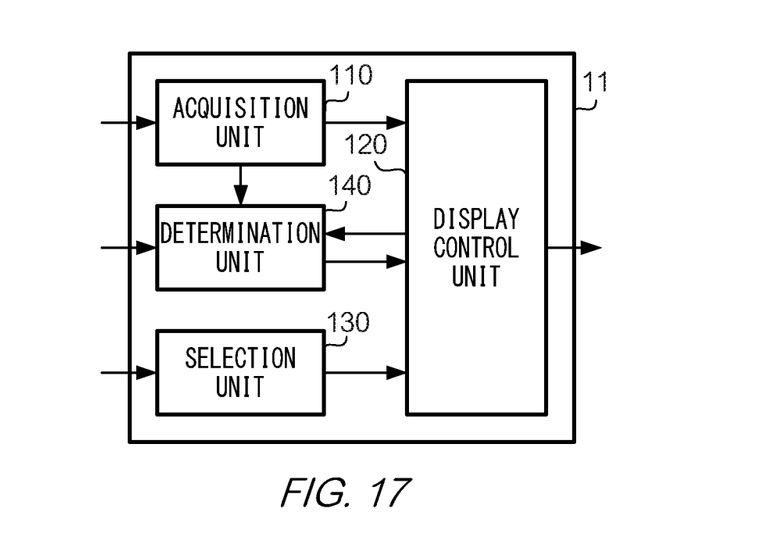
FIG. 17 is a diagram showing a functional configuration of the user terminal according to another modification.

FIG. 17 shows a functional configuration of user terminal 10 according to this modification. Control unit 11 of user terminal 10 realizes, in addition to the function of the units shown in FIG. 8, a function corresponding to determination unit 140. Determination unit 140 is a means for determining whether content has been viewed. For example, acquisition unit 110 notifies determination unit 140 that new content is acquired. Second display controller 122 notifies determination unit 140 that preview information of content is displayed. When new content is acquired, determination unit 140 determines that the content has not been viewed. When preview information of content is displayed for a period of time greater than or equal to a predetermined time, determination unit 140 determines that the content has been viewed. Determination unit 140 notifies display controller 120 of a result of determination of whether content has been viewed, together with a menu name of the content.

Second display controller 122 switches whether to change preview information of the content according to the result of determination of whether the content has been viewed by determination unit 140. For example, when it is determined that content has been viewed, second display controller 122 displays changed preview information for the content. Meanwhile, when it is determined that the content has not been viewed, second display controller 122 does not change preview information for the content. In this display control, content whose preview information is displayed for a period of time smaller than a predetermined time is determined not to have been viewed, and the same preview information is displayed when an icon is selected subsequently. This allows preview information to be displayed again that is displayed for a short time and that is unlikely to have been viewed by a user, thus increasing a possibility that a user views the preview information. In addition, since preview information that is displayed for a long time and is likely to be viewed by a user is changed, this reduces a situation in which a user continues to view the same preview information.

It is to be noted that a determination method of determination unit 140 is not limited to the above example. For example, determination unit 140 may vary the predetermined time depending on an attribute of content (e.g., a volume of text or a number of images), an attribute of a user (e.g., age or occupation), a location of a user (e.g., home, commuting route, or workplace), or a time when preview information is displayed. Determination unit 140 may determine that content has been viewed when a predetermined operation is performed on a selected icon (e.g., the tap operation). In any of these cases, the display control described above is performed when content is determined not to have been viewed even if an icon is selected and the corresponding preview information is displayed. This increases a possibility that a user views preview information, and reduces a situation in which a user repeatedly views the same preview information.

2-9 Image Representing State of Change

Figure 18:
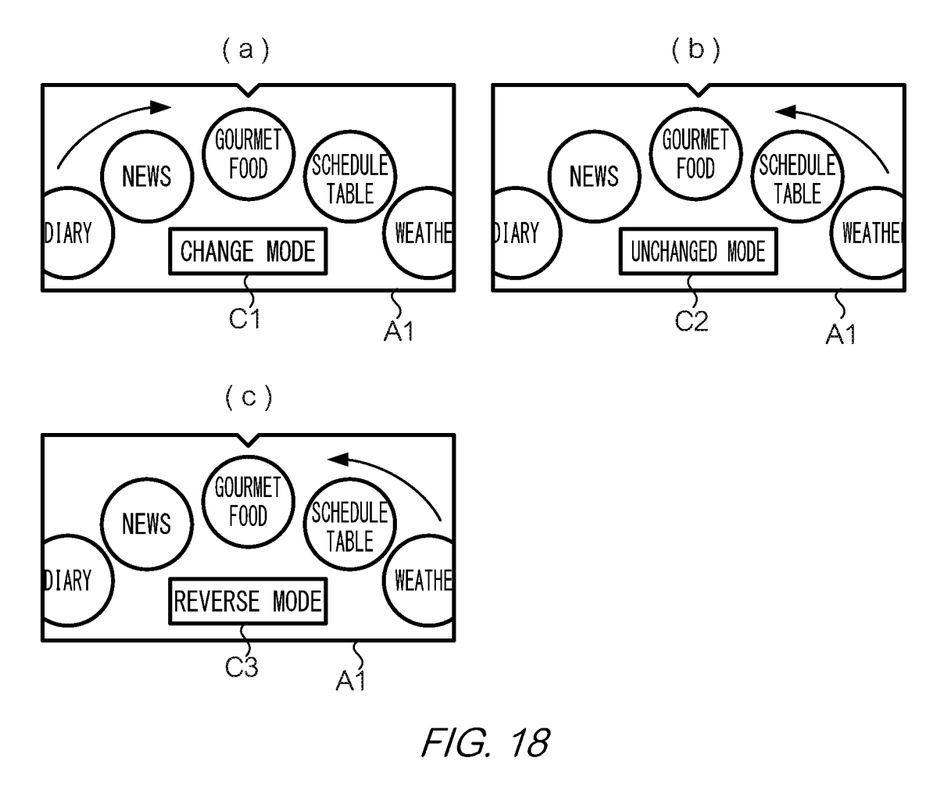
FIG. 18 is a diagram showing an example of an image representing a change in state of preview information.

Display controller 120 may display an image representing whether preview information is changed when an icon is selected. For example, an image displayed to show that preview information is changed when an icon is rotated in a clockwise direction, and also an image displayed to show that preview information is not changed when the icon is rotated in a counter-clockwise direction, will be described below.

FIG. 18 shows an example of an image representing a state of change of preview information. In FIG. 18(*a*), image C1 representing a character string "change mode" is displayed in area A1 while a plurality of icons are rotated in a clockwise direction. In FIG. 18(*b*), image C2 representing a character string "unchanged mode" is displayed in area A1 while a plurality of icons are rotated in a counter-clockwise direction. Image C1 represents a state in which changed preview information is displayed when an icon is selected. Image C2 represents a state in which preview information is not changed and the same preview information as that displayed previously is displayed when an icon is selected.

This allows a user to know whether new or previously displayed preview information is displayed when the user continues the present operation, even if the user does not recognize that an operation to change preview information or an operation not to change preview information has been performed. It is to be noted that as described above with referring to FIG. 12, when older preview information is displayed as icons rotate in a counter-clockwise direction, image C3 representing a character string "reverse mode" may be displayed as shown in FIG. 18(*c*). Image C3 represents a state in which preview information displayed each time an icon is selected reverts to old preview information. Image C3 also represents a state in which changed preview information is displayed when an icon is selected, similarly to image C1.

An image representing a state of change of preview information is not limited to the images described above. For example, color, brightness, pattern, or blinking of a background of area A1 may vary depending on the state of change. When the state of change is different for each icon, a shape, size, or motion or a feature of area A1 described above (e.g., color or brightness) may vary according to the state of change. In these cases, if a user recognizes a difference in display according to the state of change of preview information, a user can understand the state of change of preview information.

2-10 Change of Preview Information

In each of the above examples, second display controller 122 changes preview information by displaying a plurality of elements in order. The manner of changing preview information is not limited to this example. For example, when second display controller 122 displays only a part of an element (e.g., a first half of a text of top news) as preview information, second display controller 122 may display another part of the same element (e.g., a latter half of the same text) as changed preview information. When second display controller 122 displays a processed element (e.g., thumbnail generated from an image of content) as preview information, second display controller 122 may display the same element, but not as changed preview information. In this case, an image processed by another method (e.g., a portion cut out from an image of content at the same magnification) may be displayed as changed preview information.

Second display controller 122 may change preview information by displaying a portion that is randomly cut out from content (e.g., a text or an image), instead of displaying a specific element of content. In any of the cases described, at least a part of preview information to be displayed is changed. It is to be noted that the same preview information as that displayed previously may be displayed again in an alternating succession of change. However, at least, the preview information is changed from preview information that has been displayed previously; thus, a user may expect to acquire fresh knowledge by viewing preview information that is changed every time. In addition, if a user forgets preview information that has been displayed previously, a user will acquire new knowledge even if the preview information is displayed again.

2-11 Display of Preview Information

In the above embodiment, second display controller 122 displays preview information in area A2 having fixed size, shape, and arrangement. However, second display controller 122 may display preview information in an area different in size, shape, or arrangement from area A2. Second display controller 122 may vary a size, shape, and arrangement of an area in which preview information is displayed. For example, second display controller 122 may vary the size according to an amount of preview information. Second display controller 122 may vary the arrangement according to a category of content. The preview information may be displayed by scrolling, or may extend over a plurality of pages. However, to allow a user to view the preview information at first sight, it is preferred that the preview information is included within a display area.

Second display controller 122 may display preview information on an icon in an overlapping manner. In this case, when a position at which an icon is displayed is notified from first display controller 121, second display controller 122 disposes preview information on an icon in the overlapping manner. For example, first display controller 121 magnifies an icon stopped at a predetermined position, and second display controller 122 displays preview information inside the icon. Second display controller 122 may display preview information in both area A2 and the icon. In any of these cases, preview information displayed on the icon is changed each time the icon is selected.

2-12 Display of Icon

In the above embodiment, a plurality of icons are displayed in an elliptical line. However, a display manner of icons is not limited to this example. For example, the icons are arranged and displayed in two or more lines. Alternatively, the icons are arranged and displayed in a shape having an end (e.g., a linear shape) instead of a shape without an end, such as an elliptical shape. When the shape having an end is used, the icons may be moved in a fixed order by displaying the icons at a side of the display area opposite to the side at which they disappeared from the display area. The circular movement does not have to be used. The icons may be displayed such that they reciprocate along a line by preventing a further movement after the end of the line of icons arrives at a predetermined position.

2-13 Predetermined Position

The predetermined position, namely, a position at which preview information is displayed when an icon is displayed, may be a different position from that in the above embodiment. For example, the predetermined position may be a position other than the center of area A1 namely, the center of a display area of icons. A plurality of predetermined positions may be provided. In this case, a plurality of items of preview information may be displayed.

2-14 Display Unit

In the above embodiment, display controller 120 controls a display unit of the terminal (included in input unit 14) to display icons or other information. However, instead of this display unit, display controller 120 may control another display unit of an external device. If this display unit is sufficiently large, display controller 120 may display a plurality of icons, preview information, and content together. In this case, for example, display controller 120 may cause a plurality of icons and preview information to be displayed in a predetermined positional relationship (e.g., in adjacent areas A1 and A2 shown in FIG. 4), and may cause content to be displayed in an arrangement having no positional relationship with the plurality of icons and preview information (e.g., an arrangement determined for each app, or an arrangement freely changed by a user). It is to be noted that in another example, the positional relationship between a plurality of icons and preview information does not have to be determined, or alternatively a positional relationship between a plurality of icons, preview information, and content may be determined. In any of these cases, preview information is displayed in an area that is different from a display area of content and that is also determined to be that in which preview information is displayed.

2-15 Category of the Invention

The present invention is understood as, in addition to each information processing device such as the above user terminal and distribution device, another device realizing the function group described above, or a distribution system of content including these devices. The present invention is also understood as an information processing method to execute a process carried out by these devices, or a program causing a computer to control functions of these devices. This program may be provided by being stored in a recording medium, such as an optical disk, or may be downloaded onto a computer via a network, such as the Internet, and installed therein so as to be made available.

REFERENCE SIGNS LIST

1 Distribution system
2 Network
10 User terminal
20 Distribution device
11, 21 Control unit
12, 22 Storage unit
13, 23 Communication unit
14 Input unit
15 Output unit
16 Sensor unit
110 Acquisition unit
120 Display controller
121 First display controller
122 Second display controller 130 Selection unit
140 Determination unit

What is claimed is:

1. A display control device, comprising:
   a processor that selects an image from a plurality of images respectively corresponding to a plurality of categories of content;
   a first display controller that displays the plurality of images arranged in at least one line on a menu screen and moves the plurality of images in a circle along the at least one line according to an operation performed by the user; and
   a second display controller that displays information on the menu screen with the plurality of images, the information representing at least one of a plurality of previews of content corresponding to a first selected image of the plurality of images selected by the processor displayed at a predetermined position on the at least one line;
   when a first selected image moves in a first direction to the predetermined position, the second display controller displays a first preview of content on the menu screen;
   when the first selected image subsequently moves past the predetermined position in the first direction and then moves back to the predetermined position in a second direction opposite the first direction, the display controller displays the first preview of content on the menu screen;
   when the first selected image subsequently moves past the predetermined position in the first direction and then moves back to the predetermined position in the first direction, the display controller displays a second preview of content on the menu screen different from the first preview of content;
   when the first selected image moves in the first direction, the second display controller displays in a first order a different preview of content each time the first selected image subsequently moves to the predetermined position in the first direction; and
   when the first selected image moves in the second direction, the second display controller displays in a second order that is opposite to the first order the different previews of content each time the first selected image subsequently moves to the predetermined position in the second direction.

2. The display control device according to claim 1, wherein:
   the second display controller controls the information so as to prevent any change to the information being displayed for a different selected image having a specific attribute each time the different selected image moves to the predetermined position.

3. The display control device according to claim 1, wherein:
   the second display controller displays in a predetermined order a different preview of content each time a different selected image subsequently moves to the predetermined position.

4. The display control device according to claim 3, wherein the predetermined order is determined for a user of the display control device.

5. The display control device according to claim 1, wherein:
   the processor determines whether the content has already been viewed; and
   the second display controller determines whether to change the information of the content based on a result of determination of whether the content has already been viewed.

6. The display control device according to claim 1, wherein the second display controller controls the information so as to prevent any change being made to the information until a number of times of selection of a different selected image corresponding to the information reaches a number of times that is determined based on an attribute of the information.

7. The display control device according to claim 1, wherein the second display controller does not change a preview of content displayed on the menu screen when a different selected image moves back to the predetermined position at a speed less than a threshold, and displays a different preview of content when the different selected image moves back to the predetermined position at a speed greater than the threshold.

8. A program stored on a non-transitory computer readable medium for causing a computer to execute a process, the process comprising:
   selecting an image from a plurality of images respectively corresponding to a plurality of categories of content;
   displaying the plurality of images arranged in at least one line on a menu screen;
   moving the plurality of images in a circle along the at least one line according to an operation performed by the user;
   displaying information on the menu screen with the plurality of images, the information representing at least one of a plurality of previews of content corresponding to a selected image of the plurality of images selected by the processor displayed at a predetermined position on the at least one line;
   displaying a first preview of content on the menu screen when a first selected image moves in a first direction to the predetermined position;
   displaying the first preview of content on the menu screen when the first selected image subsequently moves past the predetermined position in the first direction and then moves back to the predetermined position in a second direction opposite the first direction;
   displaying a second preview of content on the menu screen different from the first preview of content when the first selected image subsequently moves past the predetermined position in the first direction and then moves back to the predetermined position in the first direction;
   displaying in a first order a different preview of content each time the first selected image subsequently moves to the predetermined position in the first direction; and
   displaying in a second order that is opposite to the first order the different previews of content each time the first selected image subsequently moves to the predetermined position in the second direction.

* * * * *